2,929,845

EULICININE

Robert E. Harman, Avenel, and Norman G. Brink, Westfield, N.J., assignors to Merck & Co., Inc., Rahway, N.J., a corporation of New Jersey No Drawing. Application May 15, 1958
Serial No. 735,369

1 Claim. (Cl. 260—564)

This invention relates to an antifungal compound which we have called eulicinine, having the chemical structure:

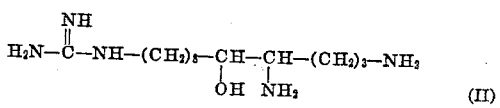

(II)

This compound has been obtained by the chemical degradation of the antibiotic eulicin[1] which is disclosed and claimed in the Charney et al. patent application Ser. No. 725,442, which was filed on March 31, 1958.

We have also found that eulicinine (II) may be treated to produce a derivative compound (III) which we have termed eulamine:

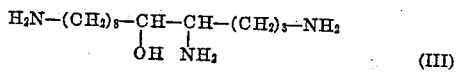

(III)

Eulicinine (II) is conveniently produced by acid hydrolysis of eulicin and preferably by acid hydrolysis of eulicin acetate. The purified eulicinine is obtained by solvent-partition chromatography. The following example illustrates this procedure:

EXAMPLE I

Preparation of eulicinine

*Eulicin hydrochloride.*—A solution of 1 g. of crude eulicin helianthate (obtained as described in Ser. No. 543,755) in 25 ml. of hot methanol was cooled to incipient crystallization. Conc. hydrochloric acid (0.5 ml.) was added, the mixture cooled in ice for an hour and the dye filtered. The last traces of methyl orange were removed from the filtrate by passage through a 0.5 g. Norite column. Supercel (3 g.) was suspended in the colorless solution, 35 ml. of acetone added with stirring and then 200 ml. of ether. The solid was filtered, washed with ether, and finally extracted on the funnel with a total of 20 ml. of water. Lyophilization gave 385 mg. (92%) of eulicin trihydrochloride ($R_f$ 0.7, strong positive Sakaguchi reaction, weak ninhydrin) as a hygroscopic white powder. All samples studied had poorly defined infrared spectra with broad absorption near $3\mu$ and at $6-6.5\mu$.

*Analysis.*—Calcd. for $C_{24}H_{52}O_2N_8 \cdot 3HCl$: Cl, 17.91. Found: Cl, 17.55.

*Eulicin acetate.*—A solution of 400 mg. (0.29 millimole) of the helianthate in about 15 ml. of warm methanol was put on a 20 ml. column of IRA 400 resin on the acetate cycle. The Sakaguchi-positive effluent was taken to dryness to yield 180 mg. (104%) of amorphous hygroscopic acetate, $R_f$ 0.7. The infrared spectrum was poorly defined and like that of the hydrochloride.

*Analysis.*—Calcd. for $C_{24}H_{52}O_2N_8 \cdot 2HOAc$: N, 18.53; HOAc, 19.85; for $C_{24}H_{52}O_2N_8 \cdot 3HOAc$: N, 16.85, HOAc, 27.09. Found: N, 19.85; HOAc, 22.72.

*Acid hydrolysis of eulicin.*—Preliminary investigations in which the results were followed by paper chromatography[1] showed that eulicin was cleaved slowly at 25° and more rapidly at 100° by 4 N hydrochloric acid to yield two new substituted guanidines (Sakaguchi test) of $R_f$ values of 0.5 and 0.85. In a preparative experiment, 2.79 g. of eulicin acetate was dissolved in 25 ml. of 4 N acid and heated on the steam cone for four hours. The hot solution was decolorized with Norite and cooled in ice for one hour. The white crystalline 9-guanidinononanoic acid hydrochloride (0.93 g., $R_f$ 0.85) was then collected and the filtrate reserved for isolation of eulicinine.

Recrystallized from 4 N hydrochloric acid, the guanidino acid hydrochloride melted at 165–166° (dec.) its infrared spectrum in Nujol was characterized by bands at 2.96, 3.18, 5.82, 6.0 (broad) and $6.16\mu$.

*Analysis.*—Calcd. for $C_{10}H_{22}O_2N_3Cl$: N, 17.69; Cl, 14.08. Found: N, 16.73; Cl, 13.91.

The eulicinine-containing filtrate from the guanidino acid hydrochloride was evaporated to dryness, freed of chloride ion on a 50 ml. IRA 400 column (acetate cycle) and fractionated on a solvent-partition column. This column was prepared by slurrying 200 g. of Supercel in excess of upper phase from equilibration of equal volume of 1-butanol and 1% acetic acid, and then shaking vigorously with 120 ml. of lower phase. The column was packed by gravity alone. Subtrate was applied to the column in solution in a small volume of upper phase. A series of 135 ml. fractions was collected. The first three fractions contained a further quantity of 155 mg. of 9-guanidinononanoic acid. These were followed by five nearly solute-free fractions. After this, ten 270 ml. fractions were collected containing 1.70 g. of eulicinine (II). Paper chromatography in the system 1-butanol; water; acetic acid (4:5:1), showed a single spot, both ninhydrin and Sakaguchi positive, at $R_f$ 0.5. A noncrystalline acetate salt, $[\alpha]_D^{25}+3°$ (c. 0.77 in water), was prepared by use of IRA 400 on the acetate cycle.

*Analysis.*—Calcd. for $C_{14}H_{33}ON_5 \cdot HOAc$: C, 55.3; H, 10.7; N, 20.2; HOAc, 17.3; for $C_{14}H_{33}ON_5 \cdot 2HOAc$; HOAc, 29.5. Found: C, 55.5; H, 9.4; N, 20.8; HOAc, 26.1.

Eulicinine helianthate (M.P. 155–158° dec.) was prepared as described above for eulicin helianthate.

*Analysis.*—Calcd. for $C_{14}H_{33}OH_5 \cdot 3C_{14}H_{15}O_3N_3S$: methyl orange.HCl, 85.2. Found: methyl orange.HCl, 82.0.

Eulicin (I) and eulicinine (II) were compared for activity against *Blastomyces dermatitidis* infection in mice produced by intravenous or intraperitoneal route and treating by intraperitoneal route. This trial was also designed to assess the utility of each route of infection for chemotherapeutic studies.

Culture for infecting animals was prepared by growing *B. dermatitidis* ATCC–10225 in yeast-glycine dextrose medium at 37° C. for five days. The culture was agitated continuously on a shaker during incubation. The growth in such cultures appears finely granular and can be standardized turbidimetrically. For intravenous inoculation, culture was adjusted to permit 90% transmission of light at 620 M.W. and the standardized suspensions were diluted 100-fold in two 10-fold steps. For

---

[1] In order to avoid difficulties encountered in the paper chromatography of hydrochloric acid hydrolysates, apparently caused by the presence of different ionic species of the same product, the papergram studies were carried out on samples that had been freed of chloride ion by treatment with IRA 400 resin on the acetate cycle.

intraperitoneal injection culture was standardized to permit 70% transmission of light at 620 mμ. The standardized suspension was diluted 10 and 100 fold and each of the three components in the dilution series were then mixed with an equal volume of 4% suspension of mucin. The test compounds, eulicin (I) and eulicinine (II) were dissolved in distilled water at concentrations to contain the desired daily dose of agent in 0.25 ml. of solution.

Barckman IS32 white mice weighing 16 gms. were infected by the intravenous route with 0.25 ml. amounts of an aqueous suspension of the above culture, or by the intraperitoneal route with the culture suspended in a mucin solution. The test animals were treated intraperitoneally once daily 5 days per week with the above eulicin and eulicinine preparations. Treatment was stopped when one-half the infected controls in the intravenously and intraperitoneally infected series were dead, 29 and 26 days respectively after infection. Mice dying during the course of the test period as well as those surviving at the end of the test period were submitted to autopsy and the lungs were observed for the extent of gross pathological blastomyces involvement after a minimum of 48 hours fixation in 10% formalin solution.

A score of 0 = No involvement
1 = Minimal involvement
2 = Moderate involvement
3 = Moderately advanced involvement
4 = Advanced involvement.

Each of the compounds was tested at 0.01, 0.05 and 0.1 mg./mouse/day against both intravenously and intraperitoneally produced infection. The results of the lung scoring and estimation of median survival time are presented in Table I. Comparisons of lung scores for eulicin and eulicinine are regrouped in Table II to facilitate analysis.

The comparisons on the basis of lung scores appear to be more informative than extention of survival time, although both categories of data are compatible. The tests with the intraperitoneal infection showed that eulicin was highly effective at the lowest dose used, 0.01 mg./mouse/day and that elucinine, although possessing activity, was less than one-tenth as active as eulicin. With the intravenous infection, there was a greater degree of gross lung involvement. Eulicin showed questionable activity at 0.01 mg. and high activity at 0.05 mg.

Testing with infection by intraperitoneal route and treatment by intraperitoneal route was more sensitive than the combination of intravenous infection and intraperitoneal treatment for detection of therapeutic activity. However, the intravenous infection with intraperitoneal treatment here gave the more useful evaluation of the highly active compound, eulicin in comparison with eulicinine.

TABLE II

| Dose | Intraperitoneal Infection—Intraperitoneal Treatment | | Intravenous Infection—Intraperitoneal Treatment | |
|---|---|---|---|---|
| | Compound | | Compound | |
| | Eulicin | Eulicinine | Eulicin | Eulicinine |
| 0.01 | 0.1 | 4.0 | 3.6 | 4.0 |
| 0.05 | 0.0 | 3.1 | 0.9 | 4.0 |
| 0.1 | 0.0 | 1.2 | 0.3 | 4.0 |

The derivative compound eulamine (III) is produced by alkaline hydrolysis of eulicinine and the following example will illustrate a representative procedure:

EXAMPLE X

*Preparation of eulamine*

Eulamine (III).—A 416-mg. quantity (1.2 millimoles) of eulicinine acetate was hydrolyzed by heating under reflux overnight in 40 ml. of 0.5 N barium hydroxide solution. A volatile base, identified as ammonia by the infrared spectrum of its hydrochloride, was liberated. The yield was 2.68 millimoles, or 116% of theory. Crude eulamine (230 mg.) was isolated from the aqueous hydrolysate by removal of barium with sulfuric acid, lyophilization of the filtrate and extraction of the residue with 1-butanol. The product had an $R_f$ value of 0.45, ninhydrin test positive, Sakaguchi test negative. Sublimation at 150° and 0.1 mm. gave 160 mg. of crystalline eulamine, M.P. 57° in the original evacuated sublimation tube. The material melted below 40° after short exposure to air. The infrared spectrum of eulamine was poorly defined; maxima were observed at about 3μ and in the 6.0–6.4μ region. Eulamine had $[\alpha]_D^{25} + 6°$ (c. 1.28 in water).

*Analysis.*—Calcd. for $C_{13}H_{31}ON_3$: N, 17.1; equiv. wt., 81.8. Found: N, 17.8, 16.6; equiv. wt. (formol titration), 83; C—$CH_3$, none.

The resin IRA 400, referred to above, is a basic resin, capable of effecting exchange of acid anions. The Supercel, referred to above, is a flux-calcined diatomaceous earth.

TABLE I

[I.P. infection series treated with test compounds, infected with undiluted 70% standardized suspension plus mucin. I.V. infection series treated with test compounds, infected with 10⁻² dilution of 90% standardized suspension.]

| Compound | Dose, Mg./Mouse/Day | Route of Infection | Route of Treatment | No. Surviving at end of Test | Gross Lung Score | Median Survival Time, Days |
|---|---|---|---|---|---|---|
| Eulicin (I) | 0.01 | I.P. | I.P. | 6/8 | 0.1 | >41 |
|  | 0.05 | I.P. | I.P. | 7/8 | 0.0 | >41 |
|  | 0.1 | I.P. | I.P. | 7/8 | 0.0 | >41 |
| Eulicin (I) | 0.01 | I.V. | I.P. | 7/8 | 3.6 | >41 |
|  | 0.05 | I.V. | I.P. | 8/8 | 0.9 | >41 |
|  | 0.1 | I.V. | I.P. | 8/8 | 0.3 | >41 |
| Eulicinine (II) | 0.01 | I.P. | I.P. | 0/8 | 4.0 | 33 |
|  | 0.05 | I.P. | I.P. | 2/8 | 3.1 | 37 |
|  | 0.1 | I.P. | I.P. | 6/8 | 1.2 | >41 |
| Euclicinine (II) | 0.01 | I.V. | I.P. | 0/8 | 4.0 | 33 |
|  | 0.05 | I.V. | I.P. | 0/7 | 4.0 | 24 |
|  | 0.1 | I.V. | I.P. | 3/7 | 4.0 | 36 |
| Infected control: | | | | | | |
| 70%—undiluted | | I.P. | | 0/8 | 3.8 | 27 |
| 70%—10⁻¹ | | I.P. | | 4/7 | 2.0 | |
| 70%—10⁻² | | I.P. | | 5/8 | 0.7 | |
| Infected control 90%—10⁻² | | I.V. | | 1/8 | 4.0 | 30 |
| Normal control | | | | 7/7 | 0.0 | |
| Do | | | | 8/8 | 0.0 | |

Eulcinine and eulamine may be represented by the structure:

$$R-NH-(CH_2)_3-CH(OH)-CH(NH_2)-(CH_2)_3-NH_2$$

in which R may be $$H- \text{ or } H_2N-C(=NH)-$$

What is claimed is:

The compound eulicinine having the structure:

$$H_2N-C(=NH)-NH-(CH_2)_3-CH(OH)-CH(NH_2)-(CH_2)_3-NH_2$$

No references cited.